United States Patent
Koronkiewicz

(10) Patent No.: US 8,556,591 B2
(45) Date of Patent: Oct. 15, 2013

(54) SYSTEMS AND METHODS FOR ASSEMBLING A ROTOR LOCK ASSEMBLY FOR USE IN A WIND TURBINE

(75) Inventor: Michael S. Koronkiewicz, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 782 days.

(21) Appl. No.: 12/764,364

(22) Filed: Apr. 21, 2010

(65) Prior Publication Data

US 2011/0135481 A1    Jun. 9, 2011

(51) Int. Cl.
*F03D 1/02* (2006.01)

(52) U.S. Cl.
USPC .................. 416/244 R; 415/122.1

(58) Field of Classification Search
USPC ........... 415/122.1, 124.1, 124.2; 416/32, 151, 416/152, 169 R, 170 R, 244 R, 246
See application file for complete search history.

(56) References Cited

U.S. PATENT DOCUMENTS

| | | | |
|---|---|---|---|
| 3,665,148 A | 5/1972 | Yasenchak et al. | |
| 4,039,038 A | 8/1977 | Wilhelm | |
| 4,118,637 A | 10/1978 | Tackett | |
| 4,239,977 A | 12/1980 | Strutman | |
| 4,297,071 A | 10/1981 | Dunbar | |
| 4,329,117 A | 5/1982 | Doman | |
| 4,402,380 A | 9/1983 | Strong | |
| 4,428,710 A | 1/1984 | Grisebach et al. | |
| 4,702,668 A | 10/1987 | Carlisle et al. | |
| 4,757,211 A | 7/1988 | Kristensen | |
| 5,269,644 A | 12/1993 | Vatel | |
| 5,277,270 A | 1/1994 | Hasegawa | |
| 5,459,918 A | 10/1995 | Uchida et al. | |
| 6,232,673 B1 | 5/2001 | Schoo et al. | |
| 6,408,974 B1 | 6/2002 | Viduya et al. | |
| 6,609,889 B1 | 8/2003 | Vilsboll | |
| 6,750,559 B2 | 6/2004 | Becker | |
| 6,833,632 B2 | 12/2004 | Becker et al. | |
| 6,879,055 B2 | 4/2005 | Becker et al. | |
| 6,911,741 B2 * | 6/2005 | Pettersen et al. ................. | 290/44 |
| 7,360,310 B2 | 4/2008 | Bagepalli et al. | |

(Continued)

FOREIGN PATENT DOCUMENTS

| | | |
|---|---|---|
| EP | 1291521 A1 | 3/2003 |
| EP | 1617075 A1 | 1/2006 |
| WO | 2008059088 A1 | 5/2008 |

*Primary Examiner* — Edward Look
*Assistant Examiner* — Christopher R Legendre
(74) *Attorney, Agent, or Firm* — James McGinness; Armstrong Teasdale LLP

(57) ABSTRACT

A method of assembling a rotor lock assembly for use in a wind turbine. The wind turbine includes a rotor rotatably coupled to a generator by the rotor shaft. The generator and the rotor shaft are supported from a bedplate frame. The rotor shaft includes a rotor lock disk. The method includes coupling a support frame to the bedplate frame. The support frame is positioned adjacent to the rotor lock disk. A plurality of lock pin housings are coupled to the support frame. Each lock pin housing of the plurality of lock pin housings is positioned with respect to the rotor lock disk. A plurality of lock pins is provided. Each lock pin of the plurality of lock pins is configured to engage the rotor lock disk. Each lock pin is coupled between a corresponding lock pin housing of the plurality of lock pin housings and the rotor lock disk to facilitate limiting a rotation of the rotor shaft.

17 Claims, 11 Drawing Sheets

(56) References Cited

U.S. PATENT DOCUMENTS

| | | |
|---|---|---|
| 7,719,129 B2 | 5/2010 | Hahlbeck |
| 7,721,434 B2 * | 5/2010 | Weaver et al. ............... 29/889.2 |
| 7,759,815 B2 | 7/2010 | Christensen |
| 7,789,189 B2 | 9/2010 | Bigg et al. |
| 7,944,079 B1 * | 5/2011 | Signore et al. ................. 290/55 |
| 7,958,797 B2 * | 6/2011 | Aust et al. .................... 74/99 R |
| 8,206,111 B2 * | 6/2012 | Aarhus et al. ............ 416/169 R |
| 8,210,810 B2 * | 7/2012 | Egoshi et al. .................... 416/1 |
| 8,287,240 B2 * | 10/2012 | Nitzpon .................... 416/204 R |
| 8,334,608 B2 * | 12/2012 | Pechlivanoglou et al. ...... 290/44 |
| 2003/0071469 A1 | 4/2003 | Becker |
| 2003/0080566 A1 | 5/2003 | Becker et al. |
| 2003/0102677 A1 * | 6/2003 | Becker et al. ................... 290/55 |
| 2004/0041407 A1 * | 3/2004 | Pettersen et al. ............... 290/55 |
| 2006/0196288 A1 * | 9/2006 | Aust et al. .................... 74/411.5 |
| 2007/0025840 A1 | 2/2007 | Weaver et al. |
| 2008/0199309 A1 | 8/2008 | Bagepalli et al. |
| 2008/0309091 A1 | 12/2008 | Hahlbeck |
| 2009/0107255 A1 | 4/2009 | Jensen |
| 2009/0149293 A1 | 6/2009 | Van Bogaert et al. |
| 2009/0162202 A1 | 6/2009 | Nies et al. |
| 2009/0261594 A1 | 10/2009 | Christensen |
| 2010/0021299 A1 * | 1/2010 | Aarhus et al. ................... 416/31 |
| 2010/0194114 A1 * | 8/2010 | Pechlivanoglou et al. ...... 290/55 |
| 2010/0296933 A1 | 11/2010 | Hicks et al. |
| 2010/0329867 A1 | 12/2010 | Patel et al. |
| 2011/0135481 A1 * | 6/2011 | Koronkiewicz ........... 416/220 R |
| 2012/0045340 A1 * | 2/2012 | Holling et al. ............ 416/220 R |
| 2012/0070304 A1 * | 3/2012 | Nielsen et al. ............ 416/244 R |
| 2013/0069373 A1 * | 3/2013 | Falkenberg et al. ............. 290/55 |
| 2013/0076040 A1 * | 3/2013 | Tsutsumi ........................ 290/54 |
| 2013/0076042 A1 * | 3/2013 | Amano et al. .................. 290/55 |

* cited by examiner

SYSTEMS AND METHODS FOR ASSEMBLING A ROTOR LOCK ASSEMBLY FOR USE IN A WIND TURBINE

BACKGROUND OF THE INVENTION

The subject matter described herein relates generally to methods and systems for assembling a rotor lock assembly for use in a wind turbine.

At least some known wind turbine towers include a nacelle fixed atop a tower. The nacelle includes a rotor assembly coupled to a gearbox and to a generator through a rotor shaft. In known rotor assemblies, a plurality of blades extend from a rotor. The blades are oriented such that wind passing over the blades turns the rotor and rotates the shaft, thereby driving the generator to generate electricity.

Because many known wind turbines provide electrical power to utility grids, at least some wind turbines have larger components (e.g., rotors in excess of thirty meters in diameter) that facilitate supplying greater quantities of electrical power. However, the larger components are often subjected to increased loads (e.g., asymmetric loads) that result from wind shears, yaw misalignment, and/or turbulence, and the increased loads have been known to contribute to significant fatigue cycles on the gearbox assembly and/or other components of the wind turbine.

At least some known wind turbines include an electric generator and a gearbox each positioned within the nacelle. The electric generator is coupled to the gearbox with a high speed shaft. At least some known gearbox assemblies facilitate transferring rotational energy from a low speed rotor shaft to a high speed shaft that rotatably drives the generator to facilitate producing electrical power. Over time, the gearbox, the generator, and/or other wind turbine components may become worn. As the wind turbine components become worn, the wind turbine becomes less effective. In at least some known wind turbines, the rotor blades are pitched to facilitate limiting a rotation of the rotor shaft to facilitate repair of the wind turbine components. In some wind turbines, the blades are between 60 and 100 meters in length, and as such, the rotor shaft may unexpectedly rotate when subjected to high wind conditions.

Accordingly, it is desirable to provide a system and method to facilitate limiting a rotation of the rotor shaft to facilitate repair and/or replacement of wind turbine components of the wind turbine.

BRIEF DESCRIPTION OF THE INVENTION

In one aspect, a method of assembling a rotor lock assembly for use in a wind turbine is provided. The wind turbine includes a rotor rotatably coupled to a generator by the rotor shaft. The generator and the rotor shaft are supported from a bedplate frame and the rotor shaft includes a rotor lock disk. The method includes coupling a support frame to the bedplate frame. The support frame is positioned adjacent to the rotor lock disk. A plurality of lock pin housings are coupled to the support frame. Each lock pin housing of the plurality of lock pin housings is positioned with respect to the rotor lock disk. A plurality of lock pins is provided. Each lock pin of the plurality of lock pins is configured to engage the rotor lock disk. Each lock pin is coupled between a corresponding lock pin housing of the plurality of lock pin housings and the rotor lock disk to facilitate limiting a rotation of the rotor shaft.

In another aspect, a rotor lock assembly for use in a wind turbine is provided. The wind turbine includes a rotor rotatably coupled to a generator by a rotor shaft and a bedplate frame configured to support the generator and the rotor shaft. The rotor shaft includes a rotor lock disk. The rotor lock assembly includes a support frame coupled to the bedplate frame. The support frame is positioned adjacent to the rotor lock disk. A plurality of lock pin housings are coupled to the support frame. Each lock pin housing of the plurality of lock pin housings is configured to be positionable with respect to the rotor lock disk. A plurality of lock pins are configured to engage the rotor lock disk to facilitate limiting a rotation of the rotor shaft. Each lock pin of the plurality of lock pins is coupled to a corresponding lock pin housing of the plurality of lock pin housings.

In yet another aspect, a wind turbine is provided. The wind turbine includes a tower, a nacelle coupled to the tower, a generator positioned within the nacelle, and a rotor rotatably coupled to the generator with a rotor shaft. The rotor shaft includes a rotor lock disk. A bedplate frame is coupled to the generator and to the rotor shaft for supporting the generator and the rotor shaft within the nacelle. A rotor lock assembly is coupled to the bedplate frame and adapted to be coupled to the rotor lock disk. The rotor lock assembly includes a support frame coupled to the bedplate frame. The support frame is positioned adjacent to the rotor lock disk. A plurality of lock pin housings are coupled to the support frame. Each lock pin housing of the plurality of the lock pin housings is configured to be positionable with respect to the rotor lock disk. A plurality of lock pins are configured to engage the rotor lock disk to facilitate limiting a rotation of the rotor shaft. Each lock pin of the plurality of lock pins is coupled to a corresponding lock pin housing of the plurality of lock pin housings.

The embodiments described herein facilitate repair and/or replacement of wind turbine components uptower of the wind turbine. More specifically, the rotor lock assembly described herein facilitates uniformly distributing a rotational moment of the rotor shaft to a bedplate support frame to facilitate limiting a rotation of the rotor shaft.

DETAILED DESCRIPTION OF THE INVENTION

The embodiments described herein include a wind turbine system that enables the maintenance of wind turbine components, particularly with respect to components located uptower of the wind turbine. More specifically, the rotor lock assembly described herein facilitates uniformly transferring a rotational moment from the rotor shaft to the bedplate to facilitate limiting a rotation of the rotor shaft. As used herein, the term "uptower" is intended to be representative of any location of the wind turbine that is above a top portion of a wind turbine tower, for example, any location within or outside of the nacelle and/or rotor while the nacelle and/or rotor are coupled to the top portion of the wind turbine tower.

Figure 1:
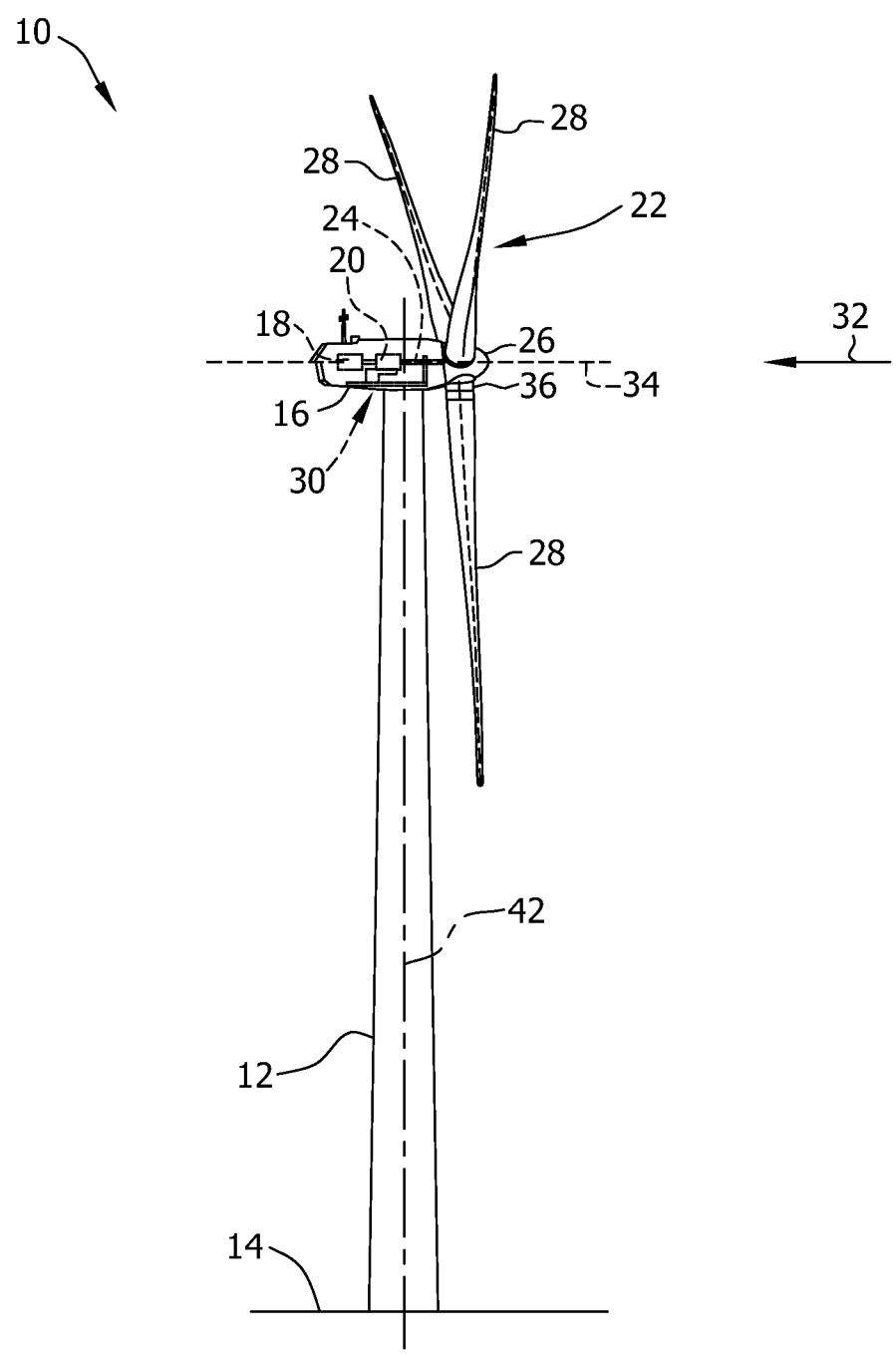
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 mounted on tower 12, a generator 18 positioned within nacelle 16, a gearbox 20 coupled to generator 18, and a rotor 22 that is rotatably coupled to gearbox 20 with a rotor shaft 24. Rotor 22 includes a rotatable hub 26 and at least one rotor blade 28 coupled to and extending outward from hub 26. A rotor lock assembly 30 is coupled to rotor shaft 24 to facilitate limiting a rotation of rotor shaft 24. In the exemplary embodiment, rotor 22 includes three rotor blades 28. In an alternative embodiment, rotor 22 includes more or less than three rotor blades 28. In the exemplary embodiment, tower 12 is fabricated from tubular steel to define a cavity (not shown in FIG. 1) that extends between support surface 14 and nacelle 16. In an alternative embodiment, tower 12 is any suitable type of tower having any suitable height.

Rotor blades 28 are spaced about hub 26 to facilitate rotating rotor 22 to enable kinetic energy to be transferred from the wind into usable mechanical energy, and subsequently, electrical energy. In the exemplary embodiment, rotor blades 28 have a length ranging from about 30 meters (m) (99 feet (ft)) to about 120 m (394 ft). Alternatively, rotor blades 28 may have any suitable length that enables wind turbine 10 to function as described herein. For example, other non-limiting examples of rotor blade lengths include 10 m or less, 20 m, 37 m, or a length that is greater than 120 m. As wind strikes rotor blades 28 from a direction 32, rotor 22 is rotated about an axis of rotation 34. As rotor blades 28 are rotated and subjected to centrifugal forces, rotor blades 28 are also subjected to various forces and moments. As such, rotor blades 28 may deflect and/or rotate from a neutral, or non-deflected, position to a deflected position. Moreover, a pitch angle or blade pitch of rotor blades 28, i.e., an angle that determines a perspective of rotor blades 28 with respect to direction 32 of the wind, may be changed by a pitch adjustment system 36 to control the load and power generated by wind turbine 10 by adjusting an angular position of at least one rotor blade 28 relative to wind vectors.

Figure 2:
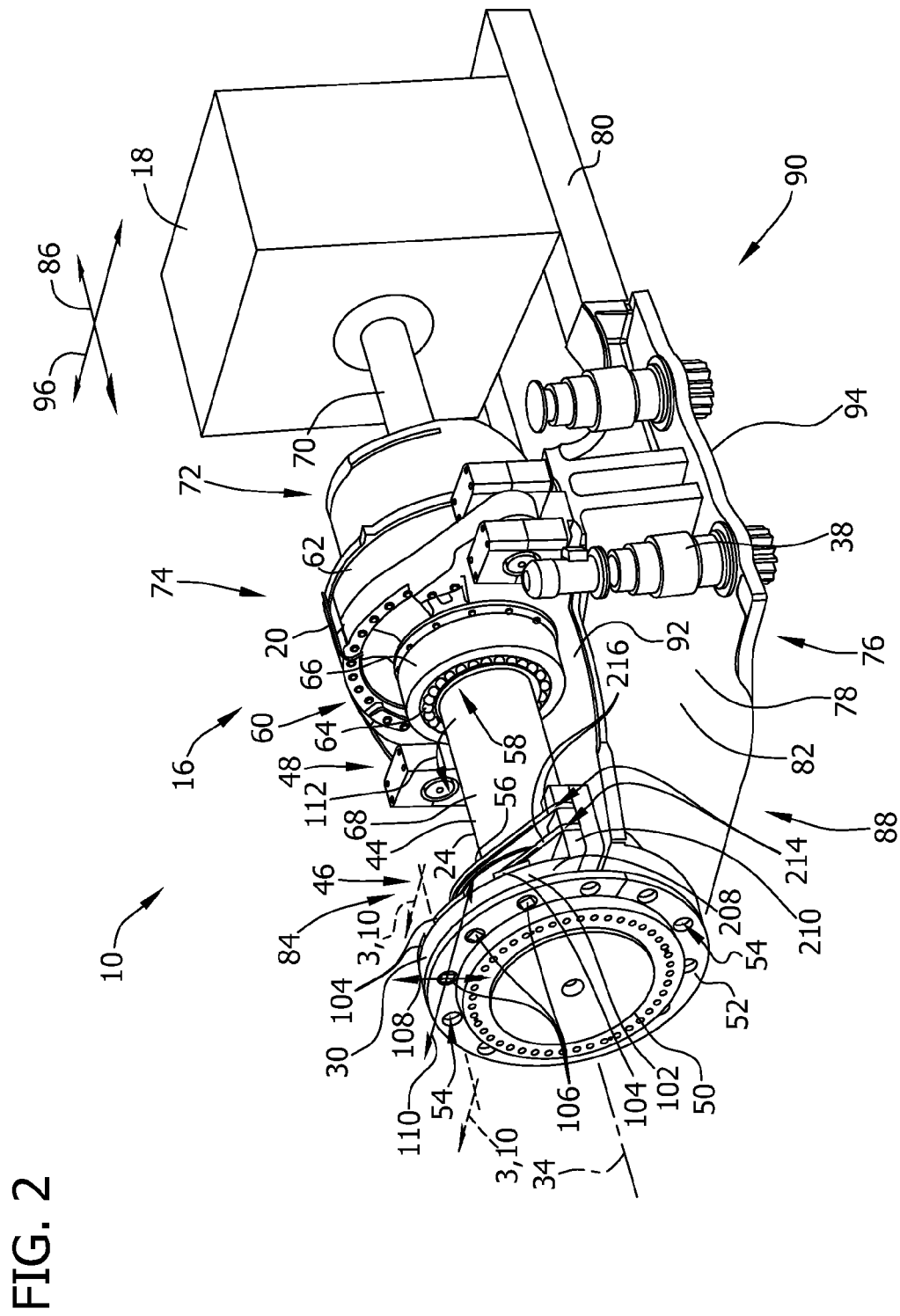
FIG. 2 is an enlarged perspective view of a portion of the wind turbine shown in FIG. 1 including an exemplary rotor lock assembly.

FIG. 2 is an enlarged perspective view of a portion of wind turbine 10. In the exemplary embodiment, rotor shaft 24, gearbox 20, generator 18, and a yaw drive mechanism 38 are at least partially positioned within nacelle 16. Yaw drive mechanism 38 facilitates rotating nacelle 16 and hub 26 on yaw axis 42 (shown in FIG. 1) to control the perspective of rotor blades 28 with respect to direction 32 of the wind. Rotor shaft 24 includes a substantially cylindrical body 44 that extends between a first end 46 and an opposite second end 48. First end 46 is coupled to rotor 22 (shown in FIG. 1). More specifically, rotor shaft 24 includes a rotor flange 50 that is fixedly coupled to rotor shaft first end 46. Hub 26 (shown in FIG. 1) is coupled to rotor flange 50 such that a rotation of hub 26 about axis 34 facilitates rotating rotor shaft 24 about axis 34. A rotor lock disk 52 is coupled to first end 46 of rotor shaft 24. Rotor lock disk 52 defines a plurality of openings 54 each extending through rotor lock disk 52 and positioned circumferentially about rotor lock disk 52. In the exemplary embodiment, wind turbine 10 also includes a shaft support bearing 56. Shaft support bearing 56 facilitates radial support and alignment of rotor shaft 24. In one embodiment, shaft support bearing 56 is coupled to first end 46 of rotor shaft 24 near rotor flange 50. In an alternative embodiment, wind turbine 10 may include any number of support bearings that enable wind turbine 10 to function as described herein.

Second end 48 is rotatably coupled to gearbox 20. In the exemplary embodiment, gearbox 20 defines an opening 58 through a forward section 60 of a gearbox housing 62. Opening 58 is sized to receive second end 48. Gearbox 20 includes a planet carrier 64 coupled to forward section 60. Planet carrier 64 is configured to receive second end 48 of rotor shaft 24. Planet carrier 64 includes a substantially circular inner surface (not shown) that defines an opening (not shown) sized to receive rotor shaft 24 therein. A shrink disk 66 is coupled to planet carrier 64 and extends radially outwardly from planet carrier 64 such that planet carrier 64 is between shrink disk 66 and rotor shaft 24. Shrink disk 66 is configured to compress planet carrier 64 about an outer surface 68 of rotor shaft 24 to facilitate coupling planet carrier 64 to rotor shaft 24 via a friction fit. A high speed shaft 70 is coupled between a rearward portion 72 of gearbox 20 and generator 18. During operation of wind turbine 10, a rotation of rotor shaft 24 rotatably drives gearbox 20 that subsequently drives high speed shaft 70. High speed shaft 70 rotatably drives generator 18 to facilitate production of electrical power by generator 18. Rotor shaft 24, generator 18, gearbox 20, high speed shaft 70, and/or shaft support bearing 56, are sometimes referred to as a drive train 74. In the exemplary embodiment, drive train 74 is supported by drive train support assembly 76. Drive train support assembly 76 includes a bedplate frame 78 and a generator frame 80 that is cantilevered from bedplate frame 78. In one embodiment, gearbox 20, rotor shaft 24, and shaft support bearing 56 are each supported by bedplate frame 78. Generator 18 is supported by generator frame 80.

In the exemplary embodiment, bedplate frame 78 includes a first sidewall 82 and an opposite second sidewall 84 each extending in a longitudinal direction 86 between a front section 88 and a rear section 90. First sidewall 82 and second sidewall 84 each include a top plate 92 and a bottom plate 94. Shaft support bearing 56 is coupled to front section 88 of bedplate frame 78 and extends in a transverse direction 96 between first sidewall 82 and second sidewall 84. Rotor shaft 24 extends through shaft support bearing 56 and is supported by shaft support bearing 56 and gearbox 20. In the exemplary embodiment, rotor 22 (shown in FIG. 1) is coupled to rotor shaft 24 such that rotor 22 is supported by shaft support bearing 56 and by gearbox 20 with rotor shaft 24. In an alternative embodiment, wind turbine 10 does not include gearbox 20. In the alternative embodiment, rotor shaft 24 is coupled between rotor 22 and generator 18, and is supported by shaft support bearing 56 and generator 18.

In the exemplary embodiment, rotor lock assembly 30 is coupled to front section 88 of bedplate frame 78 and is coupled to rotor lock disk 52 to facilitate limiting a rotation of rotor shaft 24. Rotor lock assembly 30 includes a support frame 102 coupled to bedplate frame 78, a plurality of lock pin housings 104 coupled to support frame 102, and a plurality of lock pins 106 coupled to each lock pin housing 104 and adapted to contact rotor lock disk 52. Each lock pin 106 is configured to be inserted through a corresponding rotor lock disk opening 54 to facilitate coupling rotor lock assembly 30 to rotor lock disk 52. Each lock pin housing 104 is configured to be positionable in a radial direction 108 and a tangential direction 110 with respect to rotor lock disk 52 to facilitate aligning lock pin 106 coaxially with rotor lock disk opening 54.

During operation of wind turbine 10, a rotation of rotor 22 rotates rotor shaft 24 about axis 34 such that a rotational moment (represented by arrows 112 in FIG. 2) is imparted from rotor shaft 24 to gearbox 20 and/or generator 18. Over time, drive train 74 may require a repair and/or replacement. Rotor lock assembly 30 is configured to facilitate limiting a rotation of rotor shaft 24 to facilitate repair of drive train 74 uptower of wind turbine 10. Rotor lock assembly 30 is further configured to transfer rotational moment 112 from gearbox 20 and/or generator 18 to bedplate frame 78. More specifically, rotor lock assembly 30 is configured to uniformly transfer at least a portion of rotational moment 112 to each rotor lock pin 106 such that each rotor lock pin 106 is subject to a substantially equal portion of rotational moment 112.

Figure 3:
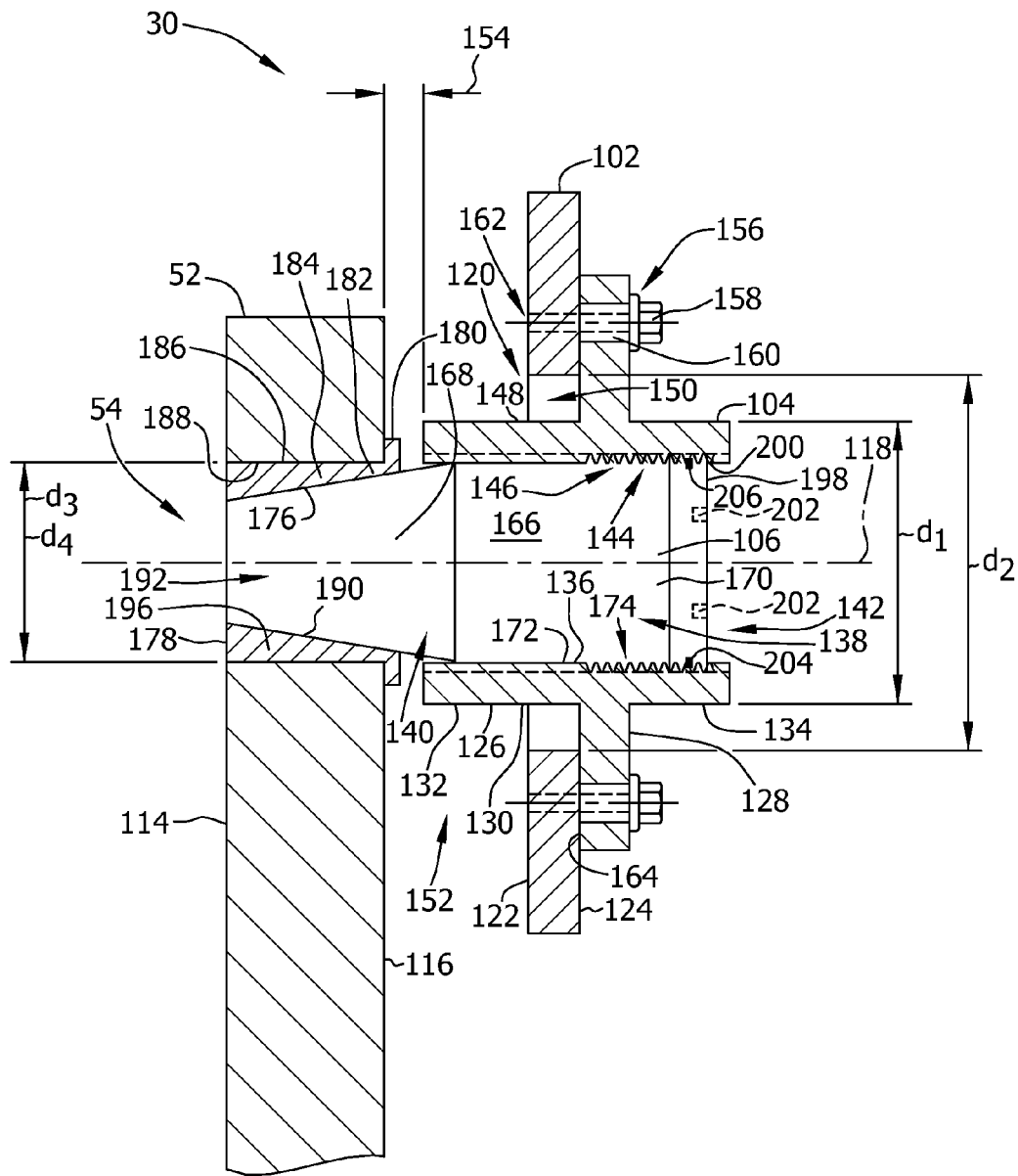
FIG. 3 is a partial cross-sectional view of the rotor lock assembly shown in FIG. 2.
Figure 4:
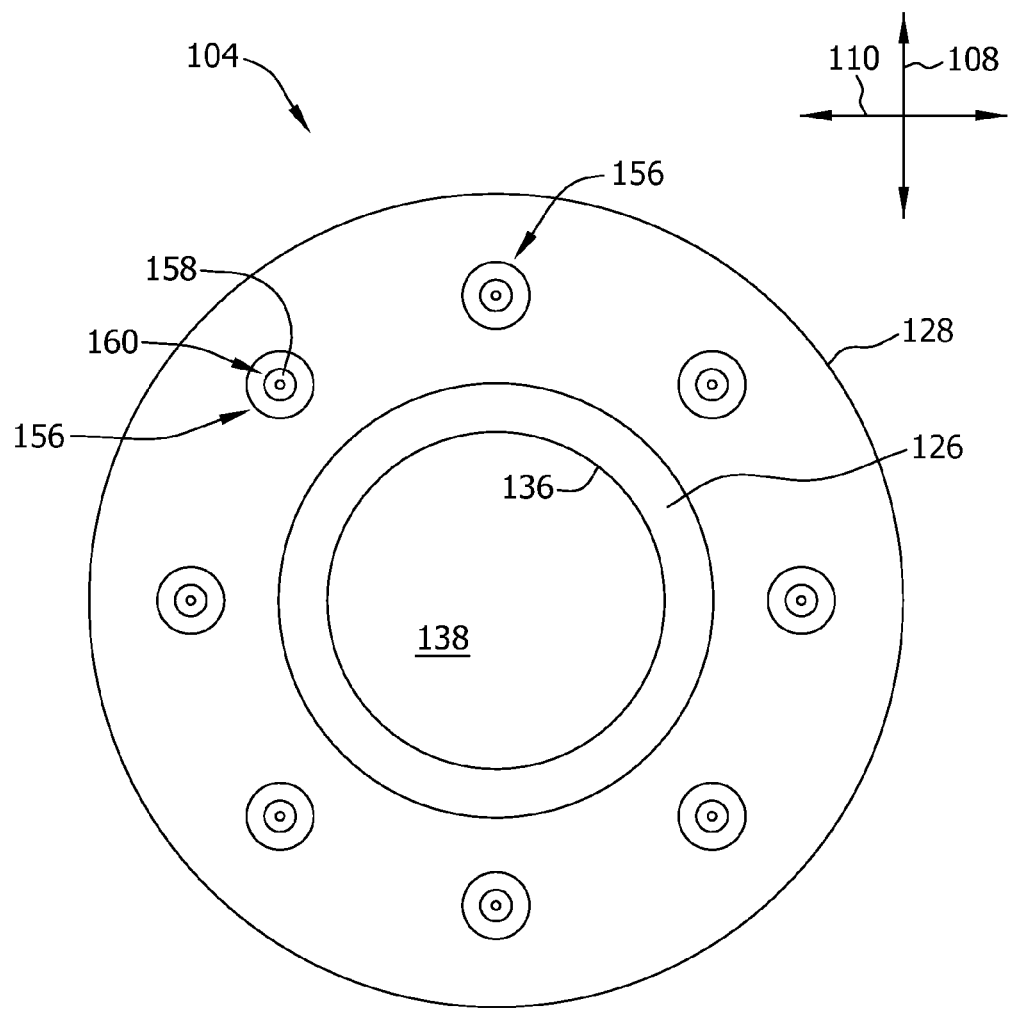
FIG. 4 is a front view of an exemplary lock pin housing suitable for use with the rotor lock assembly shown in FIG. 2.

FIG. 3 is a partial cross-sectional view of rotor lock assembly 30 along section line 3-3 shown in FIG. 2. FIG. 4 is a front view of lock pin housing 104. Identical components shown in FIG. 3 and FIG. 4 are labeled with the same reference numbers used in FIG. 2. In the exemplary embodiment, each rotor lock disk opening 54 extends between a forward surface 114 and an end surface 116 and defines a central axis 118. Support frame 102 defines a plurality of central openings 120 between a front surface 122 and a rear surface 124. Each central opening 120 is spaced circumferentially outwardly from rotor shaft 24 (shown in FIG. 2) and is aligned substantially coaxially with a corresponding rotor lock disk opening 54. Central opening 120 is sized to receive a corresponding lock pin housing 104. Lock pin housing 104 includes a pin support member 126 and a lock flange 128 that extends circumferentially about pin support member 126. Pin support member 126 has a body 130 extending between a first end 132 and a second end 134. Body 130 has a substantially cylindrical shape and includes an inner surface 136 that defines a pin cavity 138 extending in longitudinal direction 86 between a first opening 140 defined by first end 132 and a second opening 142 defined by second end 134. Pin cavity 138 is sized to receive lock pin 106. At least a portion of inner surface 136 includes a threaded portion 144 configured to facilitate coupling lock pin 106 to lock pin housing 104. In one embodiment, threaded portion 144 includes a truncated head 146 to facilitate reducing a deformation of threaded portion 144 when lock pin 106 is positioned within pin cavity 138 and in contact with rotor lock disk 52.

In the exemplary embodiment, an outer surface 148 of body 130 has a first diameter $d_1$ that is smaller than a second diameter $d_2$ of central opening 120 such that a first circumferential gap 150 is defined between outer surface 148 and support frame 102. First circumferential gap 150 is configured to facilitate moving lock pin housing 104 in radial direction 108 and tangential direction 110 (both shown in FIG. 2) with respect to rotor lock disk 52 and support frame 102 to facilitate aligning lock pin 106 with rotor lock disk opening 54. Pin support member 126 is inserted through central opening 120 such that a forward portion 152 of body 130 extends outwardly from support frame 102 towards rotor lock disk 52. Pin support member 126 is positioned a distance 154 from rotor lock disk 52 such that pin support member 126 does not contact rotor lock disk 52.

Lock flange 128 defines a plurality of openings 156 oriented circumferentially about pin support member 126. Each opening 156 is sized to receive a fastener 158, such that a second circumferential gap 160 is defined between fastener 158 and lock flange 128. Second circumferential gap 160 is configured to facilitate positioning lock pin housing 104 in radial direction 108 and tangential direction 110 with respect to support frame 102. Support frame 102 includes a plurality of fastener openings 162 oriented circumferentially about central opening 120. Fastener 158 is configured to be inserted through lock flange opening 156 and through aligned fastener opening 162 to facilitate coupling lock pin housing 104 to support frame 102. An outer surface 164 of lock flange 128 contacts rear surface 124 of support frame 102 with lock pin housing 104 coupled to support frame 102.

Lock pin 106 is positioned within pin cavity 138 and extends through first opening 140 towards rotor lock disk 52. Lock pin 106 includes a substantially cylindrical lock pin body 166 that extends between a head portion 168 and an end portion 170. Head portion 168 extends between lock pin housing 104 and rotor lock disk 52, and is inserted into rotor lock disk opening 54. Lock pin 106 is configured to facilitate transferring rotational moment 112 from rotor lock disk 52 to support frame 102 to facilitate limiting a rotation of rotor shaft 24. In one embodiment, lock pin body 166 includes an outer surface 172 that includes a helical thread 174 that is configured to cooperate with inner surface threaded portion 144 to facilitate coupling lock pin 106 to lock pin housing 104. In an alternative embodiment, outer surface 172 is substantially smooth and is coupled to lock pin housing 104 with a friction fit. In the exemplary embodiment, head portion 168 includes an outer surface 176 having a frusto-conical shape and is tapered from lock pin body 166 towards rotor lock disk 52.

In the exemplary embodiment, rotor lock assembly 30 includes a plurality of lock inserts 178 positioned within each rotor lock disk opening 54 and between lock pin 106 and rotor lock disk 52. Each lock insert 178 includes an outer flange 180 that extends radially outwardly from an end portion 182 of an insert body 184. Outer flange 180 is configured to contact end surface 116 of rotor lock disk 52 to facilitate preventing lock insert 178 from moving through rotor lock disk opening 54. Insert body 184 includes an outer surface 186 that is sized and shaped to contact an inner surface 188 of rotor lock disk 52 that defines rotor lock disk opening 54. Outer surface 186 has a diameter $d_3$ that is substantially equal to a diameter $d_4$ of rotor lock disk opening 54. An inner surface 190 of insert body 184 defines a tapered cavity 192 extending between end portion 182 and a forward portion 196 of insert body 184. Cavity 192 is sized to receive head portion 168 such that outer surface 176 of head portion 168 is in contact with inner surface 190 to facilitate forming a friction fit between lock pin 106 and rotor lock disk 52. Lock insert 178 is configured to uniformly circumferentially distribute at least a portion of rotational moment 112 to outer surface 176 of head portion 168.

A lock stop 198 is coupled to lock pin housing 104 to facilitate limiting a movement of lock pin 106 in longitudinal direction 86 with respect to lock pin housing 104. Lock stop 198 is positioned within pin cavity 138 and has a threaded outer surface 200 to facilitate coupling lock stop 198 to lock pin housing 104. In one embodiment, lock stop 198 includes at least one drive hole 202 sized to receive a drive unit (not shown) to facilitate positioning lock stop 198 within pin cavity 138. In one embodiment, lock stop 198 includes a locking ring 204 extending circumferentially about outer surface 200. Locking ring 204 is positioned within a corresponding ring groove 206 defined within outer surface 200.

Figure 5:
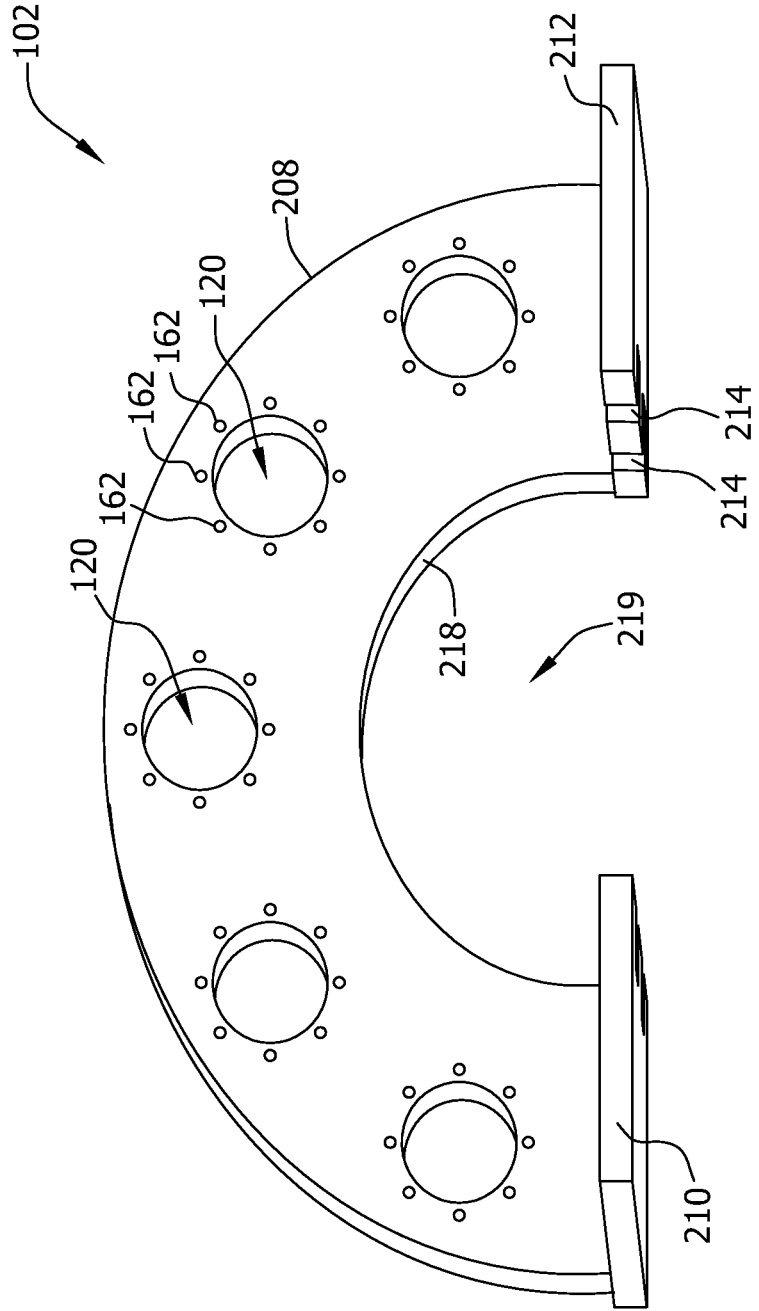
FIG. 5 is an enlarged perspective view of an exemplary support frame suitable for use with the rotor lock assembly shown in FIG. 2.

FIG. 5 is an enlarged perspective view of support frame 102. Identical components shown in FIG. 5 are labeled with the same reference numbers used in FIG. 3. In the exemplary embodiment, support frame 102 includes a support plate 208 extending between a first support pad 210 and a second support pad 212. In the exemplary embodiment, support frame 102 is coupled to shaft support bearing 56 (shown in FIG. 2) such that shaft support bearing 56 supports rotor lock assembly 30 from bedplate frame 78. More specifically, first support pad 210 extends outwardly from support plate 208 and is coupled to shaft support bearing 56 at or near first sidewall 82 (shown in FIG. 2). Second support pad 212 extends outwardly from support plate 208 and is coupled to shaft support bearing 56 at or near second sidewall 84 (shown in FIG. 2). In one embodiment, first support pad 210 and second support pad 212 each define a plurality of slots 214 sized to receive corresponding bearing support braces 216 (shown in FIG. 2). Support plate 208 defines central openings 120 extending through support plate 208. Support plate 208 further defines fastener openings 162 that extend circumferentially about central opening 120. In the exemplary embodiment, support plate 208 has an arcuate shape such that central openings 120 are aligned with corresponding rotor lock disk openings 54 spaced circumferentially about rotor lock disk 52. An inner surface 218 of support plate 208 defines a shaft opening 219 sized to receive rotor shaft 24 therethrough.

Figure 6:
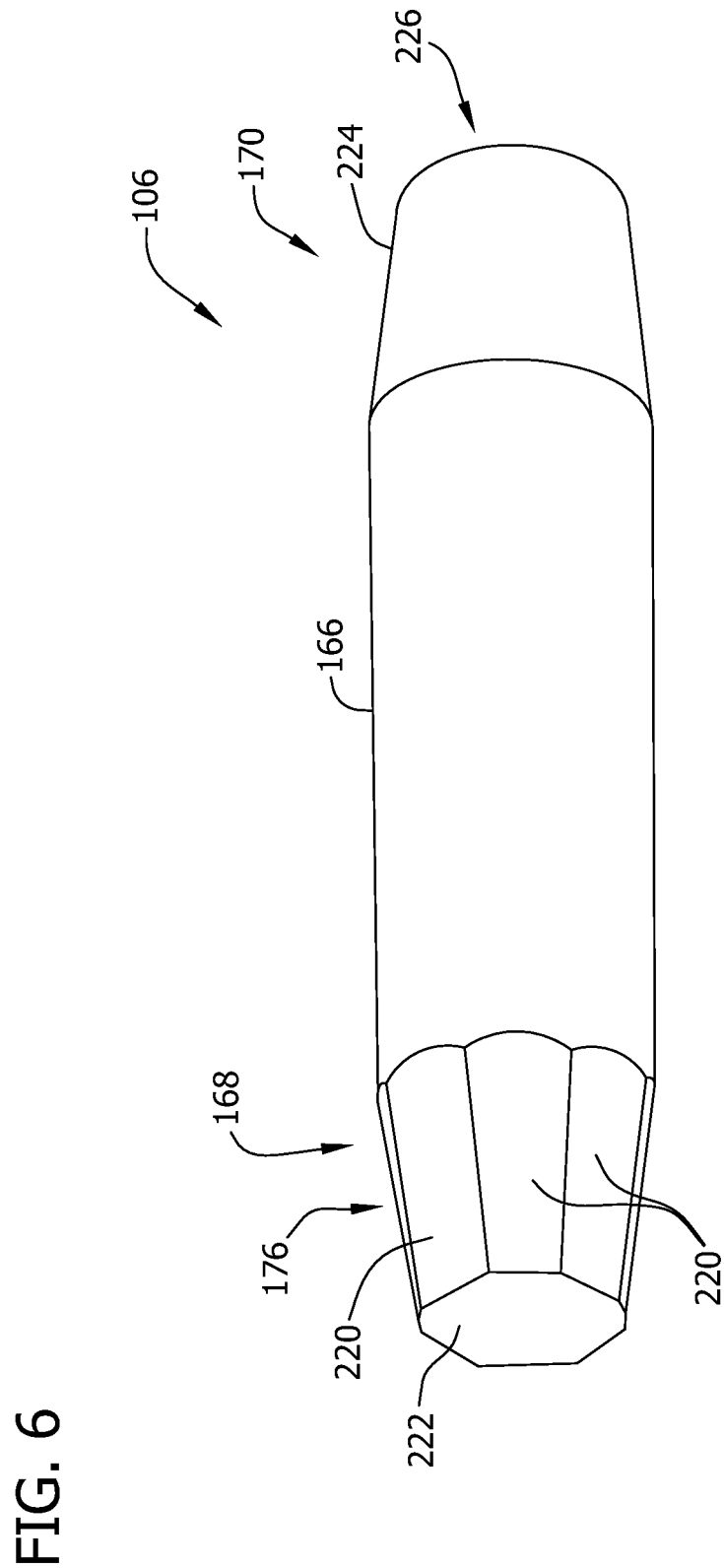
FIG. 6 is a perspective view of an exemplary lock pin suitable for use with the rotor lock assembly shown in FIG. 2.

FIG. 6 is a perspective view of an alternative embodiment of lock pin 106. Identical components shown in FIG. 6 are labeled with the same reference numbers used in FIG. 3. In the alternative embodiment, outer surface 176 of head portion 168 includes a plurality of planar surfaces 220 extending circumferentially about head portion 168. Each planar surface 220 converges from lock pin body 166 towards a forward surface 222. End portion 170 has an outer surface 224 that tapers from lock pin body 166 towards an end surface 226 to facilitate removal of lock pin 106 from lock pin housing 104.

Figure 7:
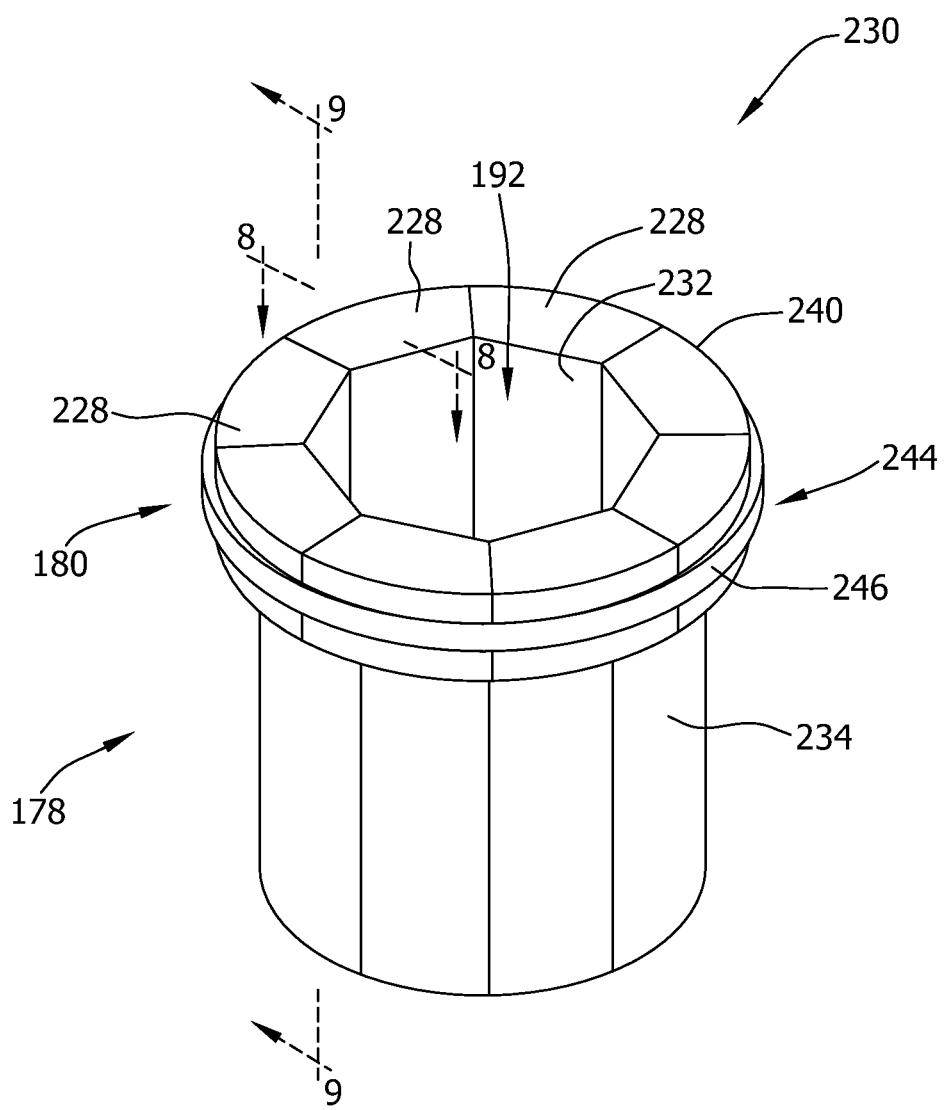
FIG. 7 is a perspective view of an alternative lock insert suitable for use with the rotor lock assembly shown in FIG. 2.
Figure 8:
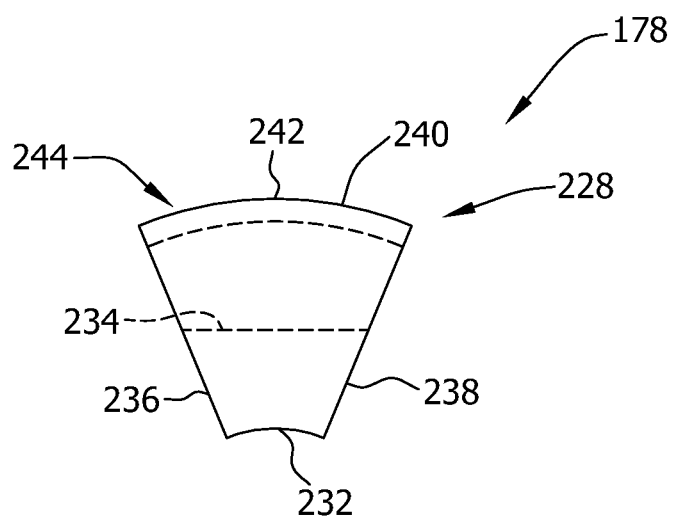
FIG. 8 is a partial sectional view of the lock insert shown in FIG. 7.
Figure 9:
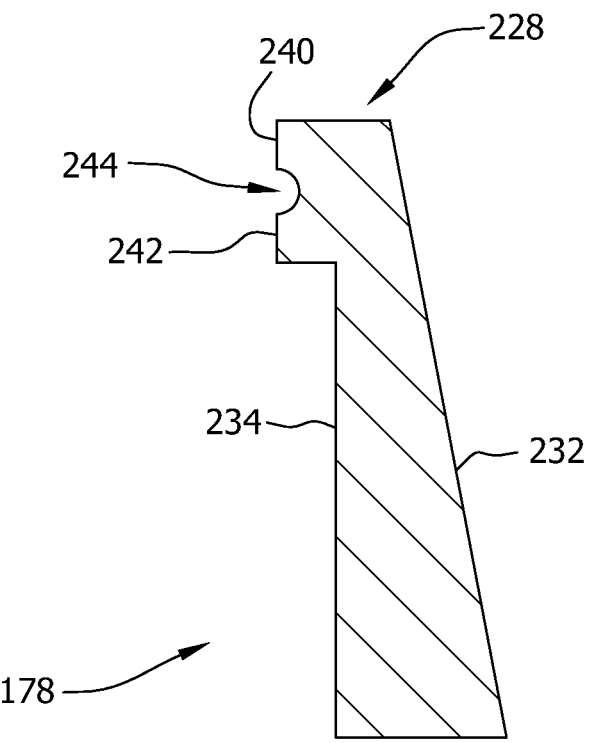
FIG. 9 is another partial cross-sectional view of the lock insert shown in FIG. 7.

FIG. 7 is a perspective view of an alternative embodiment of lock insert 178. FIG. 8 is a partial cross-sectional view of lock insert 178 along section line 8-8 shown in FIG. 7. FIG. 9 is another partial cross-sectional view of lock insert 178 along section line 9-9 shown in FIG. 7. Identical components shown in FIGS. 7-9 are labeled with the same reference numbers used in FIG. 3. In the alternative embodiment, lock insert 178 includes a plurality of collet sections 228 coupled together to form a collet 230. Each collet section 228 has an inner surface 232 and an outer surface 234, each extending between a first sidewall 236 and a second sidewall 238. An outer member 240 extends outwardly from outer surface 234 and has an upper surface 242 defining a groove 244. Each outer member 240 forms at least a portion of outer flange 180. Tapered cavity 192 is at least partially defined by each collet section inner surface 232. As lock pin 106 is inserted through collet 230, lock pin 106 contacts each inner surface 232 and moves each collet section 228 radially outwardly such that outer surface 234 of each collet section 228 contacts rotor lock disk inner surface 188 (shown in FIG. 3). Collet 230 is configured to form a friction fit between each collet section 228 and lock pin 106 to uniformly distribute rotation moment 112 from rotor lock disk 52 to lock pin 106. A retention spring 246 is positioned circumferentially about collet 230 and within each groove 244 to facilitate coupling adjacent collet sections 228 to form collet 230.

Figure 10:
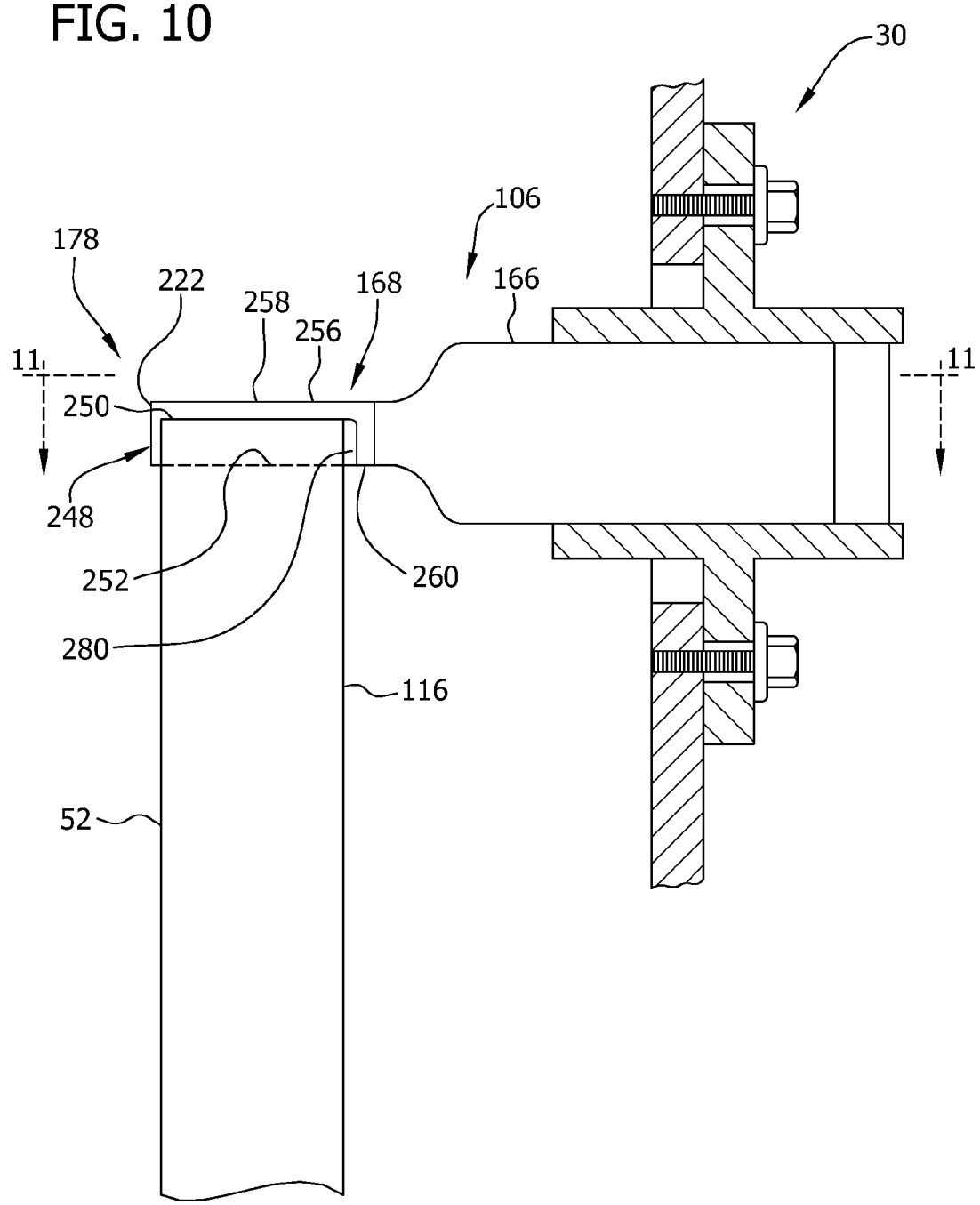
FIG. 10 is a partial cross-sectional view of an alternative rotor lock assembly.
Figure 11:
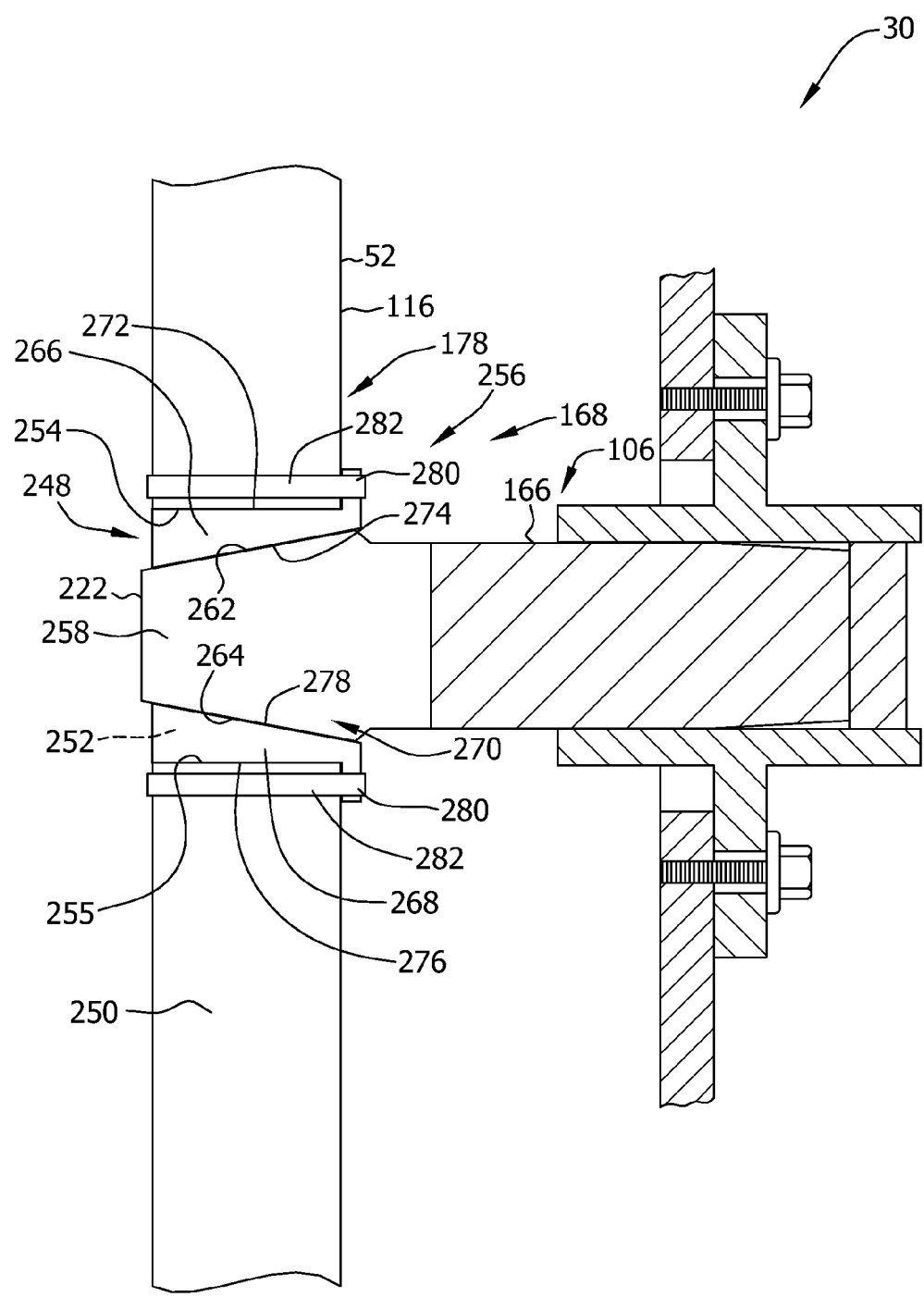
FIG. 11 is another partial cross-sectional view of the alternative rotor lock assembly shown in FIG. 10.
Figure 12:
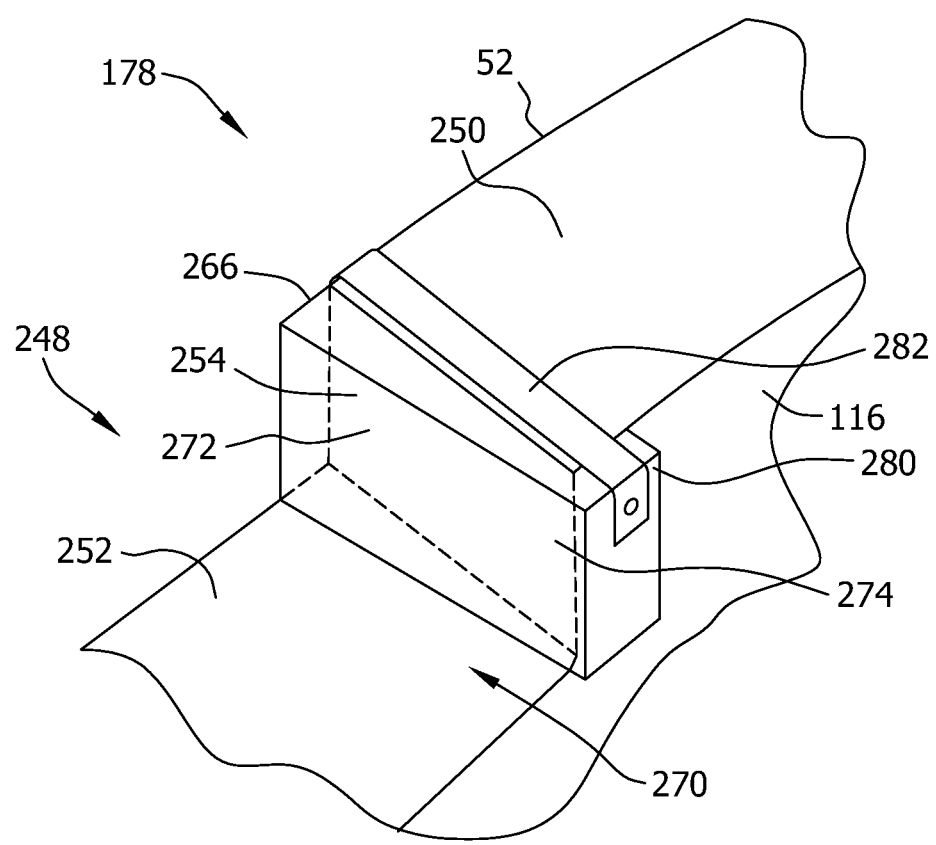
FIG. 12 is a perspective view of an exemplary lock block suitable for use with the alternative rotor lock assembly shown in FIG. 10.

FIG. 10 is a partial cross-sectional view of an alternative embodiment of rotor lock assembly 30 along section line 10-10 shown in FIG. 2. FIG. 11 is another partial cross-sectional view of the alternative embodiment of rotor lock assembly 30 along section line 11-11 shown in FIG. 10. FIG. 12 is a partial perspective view of an alternative embodiment of lock insert 178 shown in FIG. 10. Identical components shown in FIGS. 10-12 are labeled with the same reference numbers used in FIG. 3. In the alternative embodiment, rotor lock disk 52 includes at least one slot 248 defined within a radially outer surface 250. Slot 248 has a bottom surface 252 extending between a first side surface 254 and a second side surface 255. Head portion 168 of lock pin 106 includes a bar 256 extending outwardly from lock pin body 166 towards rotor lock disk 52. Bar 256 has an upper surface 258 and a lower surface 260, each extending between a first sidewall 262 and an opposing second sidewall 264. First sidewall 262 and second sidewall 264 each extend between lock pin body 166 and forward surface 222. First sidewall 262 and second sidewall 264 each converge from lock pin body 166 towards forward surface 222 such that head portion 168 has a tapered shape.

Lock insert 178 includes a first lock block 266 and a second lock block 268. Lock insert 178 is positioned within slot 248 such that first lock block 266 and second lock block 268 form a tapered opening 270 sized to receive head portion 168. First lock block 266 includes a first outer surface 272 and a first inner surface 274. First outer surface 272 is positioned adjacent first side surface 254. First inner surface 274 is oriented obliquely with respect to first outer surface 272 to at least partially define tapered opening 270. Similarly, second lock block 268 has a second outer surface 276 positioned adjacent second side surface 255, and a second inner surface 278 that is oriented obliquely with respect to second outer surface 276 to at least partially define tapered opening 270. First lock block 266 and second lock block 268 each include an outer flange 280 that is configured to contact rotor disk end surface 116. A restraint clip 282 is coupled to each outer flange 280 and to rotor lock disk radially outer surface 250 to facilitate coupling lock insert 178 to rotor lock disk 52. Lock pin 106 is positioned between first lock block 266 and second lock block 268 such that head portion 168 forms a friction fit between lock pin 106 and rotor lock disk 52. More specifically, first sidewall 262 contacts first inner surface 274 and second sidewall 264 contacts second inner surface 278 with lock pin 106 positioned within tapered opening 270.

The above-described systems and methods facilitate repairing and/or replacing wind turbine components uptower of the wind turbine. The ability to repair and/or replace wind turbine components without removing the nacelle from the wind turbine eliminates the need for large lifting cranes required to move the rotor and/or the nacelle. As such, the cost and manpower required to repair and/or replace wind turbine components from a wind turbine is significantly reduced.

Exemplary embodiments of systems and methods for assembling a rotor lock assembly for use in a wind turbine are described above in detail. The systems and methods are not limited to the specific embodiments described herein, but rather, components of the assemblies and/or steps of the methods may be utilized independently and separately from other components and/or steps described herein. For example, the methods may also be used in combination with other wind turbine components, and are not limited to practice with only the gearbox systems as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a rotor lock assembly for use in a wind turbine, the wind turbine including a rotor rotatably coupled to a generator by the rotor shaft, the generator and the rotor shaft supported from a bedplate frame, and the rotor shaft including a rotor lock disk, said method comprising:
   coupling a support frame to the bedplate frame, the support frame positioned adjacent to the rotor lock disk;
   coupling a plurality of lock pin housings to the support frame, each lock pin housing of the plurality of lock pin housings positioned with respect to the rotor lock disk;
   providing a plurality of lock pins, each lock pin of the plurality of lock pins configured to engage the rotor lock disk;
   coupling each lock pin between a corresponding lock pin housing of the plurality of lock pin housings and the rotor lock disk to facilitate limiting a rotation of the rotor shaft; and,
   coupling a plurality of lock inserts between each lock pin and the rotor lock disk to facilitate forming a friction fit between each lock pin and the rotor lock disk.

2. A method in accordance with claim 1, further comprising coupling a plurality of collet sections together to form each lock insert of the plurality of lock inserts, the lock insert defining a tapered opening sized to receive a lock pin of the plurality of lock pins, each lock pin including a tapered head portion adapted to be inserted into the tapered opening.

3. A method in accordance with claim 1, wherein the rotor lock disk defines a plurality of slots, said method further comprising:
   positioning at least one lock block of each lock insert within at least one slot; and,
   coupling at least one restraint clip to the lock block and the rotor lock disk.

4. A method in accordance with claim 1, further comprising coupling a lock stop to each lock pin housing to facilitate limiting a movement of the lock pin with respect to the lock pin housing.

5. A method in accordance with claim 1, wherein said providing a plurality of lock pins comprises providing a plurality of lock pins such that each lock pin includes a substantially cylindrical body extending between a head portion and a rear portion, the head portion and the rear portion each having tapered outer surfaces.

6. A wind turbine, comprising:
   a tower;
   a nacelle coupled to said tower;
   a generator positioned within said nacelle;
   a rotor rotatably coupled to said generator by a rotor shaft, said rotor shaft including a rotor lock disk;
   a bedplate frame coupled to said generator and to said rotor shaft for supporting said generator and said rotor shaft within said nacelle; and,
   a rotor lock assembly coupled to said bedplate frame and adapted to be coupled to said rotor lock disk, said rotor lock assembly comprising:
   a support frame coupled to said bedplate frame, said support frame positioned adjacent to said rotor lock disk;
   a plurality of lock pin housings coupled to said support frame, each lock pin housing of said plurality of said lock pin housings configured to be positionable with respect to said rotor lock disk;
   a plurality of lock pins configured to engage said rotor lock disk to facilitate limiting a rotation of said rotor shaft, each lock pin of said plurality of lock pins coupled to a corresponding lock pin housing of said plurality of lock pin housings; and
   a plurality of lock inserts, each lock insert of said plurality of lock inserts coupled between each lock pin and said rotor lock disk to facilitate forming a friction fit between said lock pin and said rotor lock disk.

7. A wind turbine in accordance with claim 6, wherein said rotor lock disk defines a plurality of openings, each lock insert comprising a plurality of collet sections inserted within each opening of said plurality of openings, said plurality of collet sections defining a tapered opening sized to receive said lock pin, said lock pin comprising a body extending between a head portion and a rear portion, said body having a substantially cylindrical shape, and said head portion comprising a tapered outer surface.

8. A wind turbine in accordance with claim 6, wherein said rear portion comprises a tapered outer surface.

9. A rotor lock assembly in accordance with claim 6, wherein said rotor lock disk defines a plurality of slots, each lock insert comprising:
   at least one lock block positioned within a slot of said plurality of slots, said lock block having a tapered inner surface sized to receive said lock pin; and,
   at least one restraint clip coupled to said lock block and said rotor lock disk, said lock pin comprising a body extending between a head portion and a rear portion, said body having a substantially cylindrical shape, and said head portion comprising a bar including first and second tapered sidewalls.

10. A rotor lock assembly in accordance with claim 6, further comprising a lock stop coupled to said lock pin housing, said lock stop configured to facilitate limiting a movement of said lock pin with respect to said lock pin housing.

11. A rotor lock assembly for use in a wind turbine, the wind turbine including a rotor rotatably coupled to a generator by a rotor shaft and a bedplate frame configured to support the generator and the rotor shaft, the rotor shaft including a rotor lock disk, said rotor lock assembly comprising:
   a support frame coupled to the bedplate frame, said support frame positioned adjacent to the rotor lock disk;
   a plurality of lock pin housings coupled to said support frame, each lock pin housing of said plurality of lock pin housings configured to be positionable with respect to the rotor lock disk;
   a plurality of lock pins configured to engage the rotor lock disk to facilitate limiting a rotation of the rotor shaft, each lock pin of said plurality of lock pins coupled to a corresponding lock pin housing of the plurality of lock pin housings; and
   a plurality of lock inserts, each lock insert of the plurality of lock inserts coupled between each lock pin and the rotor lock disk to facilitate forming a friction fit between each lock pin and the rotor lock disk.

12. A rotor lock assembly in accordance with claim 11, wherein the rotor lock disk defines a plurality of openings, each lock insert comprising a plurality of collet sections inserted within each opening of said plurality of openings, said plurality of collet sections defining a tapered opening sized to receive said lock pin.

13. A rotor lock assembly in accordance with claim 11, wherein the rotor lock disk defines a plurality of slots, each lock insert comprising:
- at least one lock block positioned within a slot of the plurality of slots, said lock block having a tapered inner surface sized to receive said lock pin; and,
- at least one restraint clip coupled to said lock block and the rotor lock disk.

14. A rotor lock assembly in accordance with claim 11, further comprising a lock stop coupled to each lock pin housing, said lock stop configured to facilitate limiting a movement of each lock pin with respect to each lock pin housing.

15. A rotor lock assembly in accordance with claim 11, wherein each lock pin comprises a body extending between a head portion and a rear portion, said body having a substantially cylindrical shape, and said head portion comprising a tapered outer surface.

16. A rotor lock assembly in accordance with claim 15, wherein said rear portion comprises a tapered outer surface.

17. A rotor lock assembly in accordance with claim 11, wherein each lock pin comprises a body extending between a head portion and a rear portion, said body having a substantially cylindrical shape, and said head portion comprising a bar including first and second tapered sidewalls.

* * * * *